(12) United States Patent
López Ona et al.

(10) Patent No.: US 10,778,140 B2
(45) Date of Patent: Sep. 15, 2020

(54) DEVICE FOR CAPTURING SOLAR ENERGY

(71) Applicant: SOLTEC ENERGÍAS RENOVABLES, S.L., Molina de Segura (ES)

(72) Inventors: Sergio López Ona, Molina de Segura (ES); Antonio José Ros Ruiz, Molina de Segura (ES)

(*) Notice: Subject to any disclaimer, the term of this patent is extended or adjusted under 35 U.S.C. 154(b) by 204 days.

(21) Appl. No.: 15/757,676

(22) PCT Filed: Sep. 14, 2016

(86) PCT No.: PCT/ES2016/000101
§ 371 (c)(1),
(2) Date: Mar. 6, 2018

(87) PCT Pub. No.: WO2017/046429
PCT Pub. Date: Mar. 23, 2017

(65) Prior Publication Data
US 2019/0036477 A1 Jan. 31, 2019

(30) Foreign Application Priority Data
Sep. 14, 2015 (ES) .................. 201531011 U

(51) Int. Cl.
*H02S 20/32* (2014.01)
*H02S 40/34* (2014.01)
(Continued)

(52) U.S. Cl.
CPC ............. *H02S 20/32* (2014.12); *F24S 25/12* (2018.05); *F24S 30/425* (2018.05); *H02S 40/34* (2014.12);
(Continued)

(58) Field of Classification Search
CPC .......... H02S 40/34; H02S 20/32; H02S 40/20; H02S 40/22; F24S 2030/15;
(Continued)

(56) References Cited

U.S. PATENT DOCUMENTS 4,000,734 A * 1/1977 Matlock .................. F24S 23/74
126/576
4,187,123 A * 2/1980 Diggs ................... G01S 3/7861
136/206
(Continued)

FOREIGN PATENT DOCUMENTS

EP 2785164 10/2014
ES 1119081 8/2014
(Continued)

OTHER PUBLICATIONS

International Search Report dated Nov. 16, 2016 for PCT/ES2016/000101.

Primary Examiner — Golam Mowla
(74) Attorney, Agent, or Firm — Eugenio J. Torres-Oyola; Victor M. Rodriguez-Reyes; Rafael Rodriguez-Muriel

(57) ABSTRACT

The present invention relates to a solar energy harvesting device, said device including several single-axis solar trackers (S1-S5), each comprising an elongated structure (4) on which a plurality of photovoltaic panels (2) are installed, and a tubular rotating shaft (1) fixed to a lower side of the structure (4). A plurality of support feet (20) rotatably support the coaxially aligned tubular rotating shafts (1) of the several single-axis solar trackers (S1-S5) on the ground. A motor rotates the tubular rotating shafts (1) according to the relative movements of the Sun. Positive and negative wires (3a, 3b) conducting electrical energy generated by the photovoltaic panels (2) connected in series of the different (Continued)

single-axis solar trackers (S1-S5) are housed inside one or more of the tubular rotating shafts (1).

15 Claims, 4 Drawing Sheets

(51) Int. Cl.
    *F24S 30/425*     (2018.01)
    *F24S 25/12*     (2018.01)
    *F24S 30/00*     (2018.01)

(52) U.S. Cl.
    CPC ........ *F24S 2030/11* (2018.05); *F24S 2030/15* (2018.05); *Y02E 10/47* (2013.01)

(58) Field of Classification Search
    CPC ...... F24S 2030/11; F24S 25/12; F24S 30/425; Y02E 10/47; H01L 31/0232; H01L 31/0236; H01L 31/054; H01L 31/0543
    See application file for complete search history.

(56) References Cited

U.S. PATENT DOCUMENTS

| | | | | |
|---|---|---|---|---|
| 4,306,540 | A * | 12/1981 | Hutchison | F24S 30/425 126/607 |
| 4,429,178 | A * | 1/1984 | Prideaux | H01L 31/0547 136/246 |
| 5,125,608 | A * | 6/1992 | McMaster | H02S 20/10 248/163.1 |
| 5,542,409 | A * | 8/1996 | Sampayo | F24S 23/77 126/606 |
| 6,058,930 | A * | 5/2000 | Shingleton | F24S 30/425 126/600 |
| 7,554,030 | B2 * | 6/2009 | Shingleton | H02S 20/32 136/246 |
| 7,557,292 | B2 * | 7/2009 | Shingleton | F24S 20/67 136/246 |
| 7,888,587 | B2 * | 2/2011 | Shingleton | F24S 20/67 136/246 |
| 7,888,588 | B2 * | 2/2011 | Shingleton | H02S 20/32 136/246 |
| 9,016,292 | B1 | 4/2015 | Schneider et al. | |
| 9,324,893 | B1 * | 4/2016 | Kats | H01L 31/0543 |
| 2003/0094194 | A1 | 5/2003 | Mattiuzzo | |
| 2010/0051018 | A1 * | 3/2010 | Ammar | F24S 20/20 126/634 |
| 2010/0205963 | A1 * | 8/2010 | Ammar | F24S 20/20 60/641.15 |
| 2013/0152915 | A1 * | 6/2013 | Marten | F24S 30/425 126/600 |
| 2014/0182577 | A1 * | 7/2014 | Linderman | H02S 20/32 126/593 |
| 2016/0365830 | A1 * | 12/2016 | Bailey | H02S 20/32 |

FOREIGN PATENT DOCUMENTS

| | | |
|---|---|---|
| WO | 9012990 | 11/1990 |
| WO | 2010064271 | 6/2010 |
| WO | 2014060415 | 4/2014 |

* cited by examiner

DEVICE FOR CAPTURING SOLAR ENERGY

RELATED APPLICATIONS

This application is the US national phase application of international application number PCT/ES2016/000101, filed 14 Sep. 2016, which designates the US and claims priority to Spanish application U201531011 filed 14 Sep. 2015, the contents of each of which are hereby incorporated by reference as if set forth in their entireties.

TECHNICAL FIELD

The present invention relates to a solar energy harvesting device including several single-axis solar trackers provided with respective coaxially aligned tubular rotating shafts.

The term "coaxially aligned" refers to the arrangement of the tubular rotating shafts of the several single-axis solar trackers in ideal conditions, i.e., in the event of being installed on completely smooth and flat land. Nevertheless, in real conditions the tubular rotating shafts may experience certain misalignment, even though a final end of a tubular rotating shaft is always facing an initial end of another adjacent tubular rotating shaft.

BACKGROUND OF THE INVENTION

Document ES 1119081 U discloses a single-axis solar tracker comprising an elongated structure on which there are installed in a co-planar manner a plurality of photovoltaic panels, a tubular rotating shaft fixed to a lower side of said structure and arranged along a longitudinal direction thereof, a plurality of support feet distributed along the structure, each support foot having an upper end which supports a bearing coupled to said tubular rotating shaft and a lower end anchored to the ground, and a drive motor operatively connected for rotating the tubular rotating shaft together with the structure and said photovoltaic panels according to the relative movements of the Sun.

Several parallel rows of single-axis solar trackers are usually arranged in a solar energy harvesting installation, such as the one described in said document ES 1119081 U, for example, where each row includes several single-axis solar trackers with the tubular rotating shafts thereof being mutually aligned. One drawback is that the conductor wires having positive and negative polarities, conducting electrical energy generated by the photovoltaic panels connected in series of the different single-axis solar trackers forming a row must be supported, for example by means of cable trays, and conducted to a junction box located in the final single-axis solar tracker of the corresponding row, which entails a complex installation and the need to incorporate numerous additional elements.

Document WO 9012990 A1 discloses a support assembly for mounting an array of photovoltaic panels to a support surface such as the ground. The support assembly comprises front and rear horizontal supports and a plurality of front and rear support posts. The photovoltaic panels are mounted lengthwise across the horizontal supports. Each support post has an anchor portion to be driven into the support surface and a leg portion which is nested therein and longitudinally adjustable to raise or lower the corresponding front and rear horizontal supports. The horizontal supports further comprise wiring raceways to support wiring harnesses originating from the photovoltaic panels and terminating at the end of each row of photovoltaic panels in the array.

Document EP 2785164 A1 describes a computer bay comprising a rack which has two side walls placed between front and rear frontages. One side wall is equipped with an opening to allow a passage of a pipe. The opening is equipped with a pipe passage device to maintain the pipe in a place. The pipe passage device is provided with a pre-cut flexible membrane to seal the opening. The flexible membrane includes a pre-cut dividing the membrane into parts to deviate and form another opening during the introduction of the pipe. The flexible membrane includes a peripheral pad to be enchased on a peripheral edge of the former opening.

DISCLOSURE OF THE INVENTION

The present invention contributes to palliating the above and other drawbacks by providing a solar energy harvesting device including several single-axis solar trackers, where each of the single-axis solar trackers comprises an elongated structure on which there are installed in a co-planar manner a plurality of photovoltaic panels, a tubular rotating shaft fixed to a lower side of the structure and arranged along a longitudinal direction thereof, a plurality of support feet distributed along the structure, each support foot having an upper end which supports a bearing coupled to the tubular rotating shaft and a lower end anchored to the ground, and a drive motor operatively connected for rotating the tubular rotating shaft together with the structure and the photovoltaic panels according to the relative movements of the Sun, and where the tubular rotating shafts of the several single-axis solar trackers are coaxially aligned.

Conductor wires having positive and negative polarities, referred to hereinafter as positive and negative wires, conducting electrical energy generated by several of the photovoltaic panels connected in series of the different single-axis solar trackers are housed inside one or more of the tubular rotating shafts.

With this arrangement, the tubular rotating shafts perform a dual function: they provide a rotating axis about which the structure and the photovoltaic panels rotate, and they support and protect the positive and negative wires conducting electrical energy generated by the photovoltaic panels to a junction box.

Preferably, the positive and negative wires from the photovoltaic panels connected in series of the different single-axis solar trackers are inserted into the tubular rotating shafts through open ends thereof. For example, the positive and negative wires emerge from an open final end of the tubular rotating shaft of one of the single-axis solar trackers and are inserted into the tubular rotating shaft of another adjacent single-axis solar tracker through an open initial end of the corresponding tubular rotating shaft. In that sense, the positive and negative wires of each single-axis solar tracker are gradually added to the positive and negative wires housed in the tubular rotating shafts of successive single-axis solar trackers and are connected to a junction box located in the final single-axis solar tracker.

The positive and negative wires are preferably conducted from the mentioned open final end of one of the tubular rotating shafts to the open initial end of the tubular rotating shaft of another adjacent single-axis solar tracker inside a protective sleeve. In one embodiment, the open initial and final ends of each tubular rotating shaft have coupled thereto respective caps provided with at least one opening. For example, each cap has one or more projections which are plugged into the corresponding open initial or final end of the tubular rotating shaft. The protective sleeve has the ends thereof connected to, for example, plugged into, these openings of the caps located at the open initial and final ends of the tubular rotating shafts of two adjacent single-axis solar trackers.

The protective sleeve is preferably made of a flexible material, and can be in the form of, for example, a corrugated tube made of plastic or elastomer.

In an alternative embodiment, the open initial and final ends of the tubular rotating shafts have respective caps provided with an opening covered by a membrane, and this membrane has one or more cuts in a central region thereof for the passage of the positive and negative wires. The membrane is optionally supported in a ring fixed to the opening. The caps also optionally have a neck having an edge defining the opening, and the ring is fixed at the rim of the neck.

In another alternative embodiment, the open initial and final ends of the tubular rotating shafts of two adjacent single-axis solar trackers are coaxially fixed to a rotating drive wheel of a drive device by tubular connecting elements. The rotating drive wheel has a central opening and the positive and negative wires go from one to the other of the open final ends of the tubular rotating shafts through the inside of the tubular connecting elements and through the central opening of the rotating drive wheel.

The open initial and final ends of the tubular rotating shafts optionally have respective caps provided with at least one opening. Inside the tubular connecting elements and through the central opening of the rotating drive wheel there is installed a protective sleeve having the ends thereof connected to the openings of the caps. The positive and negative wires are conducted from one of the open final ends of the tubular rotating shafts to the other through the inside of the protective sleeve.

Each of the tubular connecting elements also optionally has one end fixed to the rotating drive wheel and the other opposite end fixed to a support, and the corresponding tubular rotating shaft is fixed to the mentioned support by detachable fixing elements.

BRIEF DESCRIPTION OF THE DRAWINGS

The preceding and other features and advantages will be better understood from the following detailed description of a merely illustrative and non-limiting embodiment with reference to the accompanying drawings, in which.

DETAILED DESCRIPTION OF AN EXEMPLARY EMBODIMENT

Figure 1:
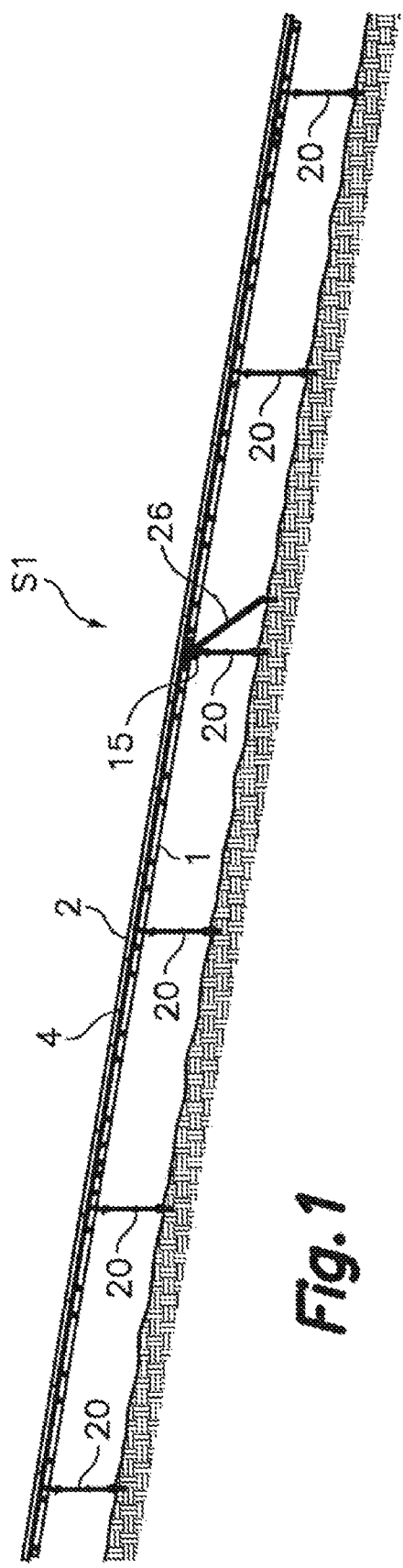
FIG. 1 is a side view of a single-axis solar tracker that s part of solar energy harvesting device according to an embodiment of the present invention.

Referring first to FIG. 1, this figure shows a single-axis solar tracker S1 comprising a structure 4 that is elongated in a longitudinal direction on which there are installed in a co-planar manner a plurality of photovoltaic panels 2. A tubular rotating shaft 1 arranged along the longitudinal direction is fixed to a lower side of the structure. A plurality of support feet 20 are distributed along the structure 4, each support feet 20 has an upper end which supports a bearing coupled to the tubular rotating shaft 1 and a lower end anchored to the ground. One of the support feet 20, which is reinforced with an additional support 26, has a drive motor 15 operatively connected for rotating the tubular rotating shaft 1 together with the structure 4 and the photovoltaic panels 2 according to the relative movements of the Sun.

Figure 2:
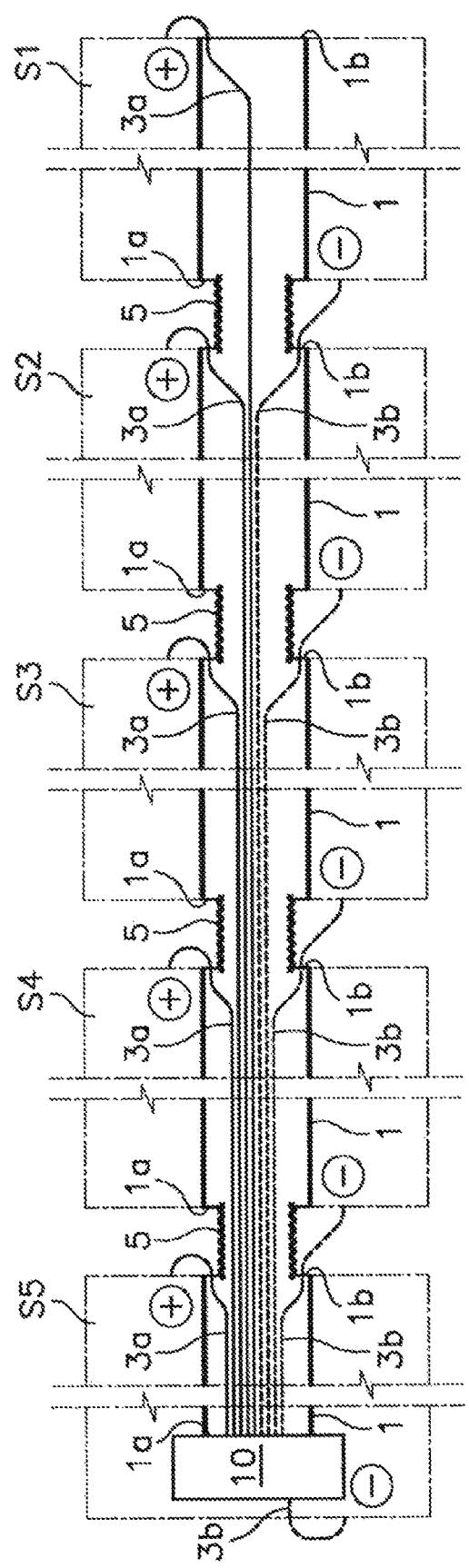
FIG. 2 is a schematic plan view of the solar energy harvesting device of the present invention including several single-axis solar trackers arranged forming a row.

FIG. 2 shows a solar energy harvesting device including several single-axis solar trackers S1-S5 arranged forming a row, where the tubular rotating shafts 1 of the several single-axis solar trackers S1-S5 are coaxially aligned, or they are as coaxially aligned as allowed by the conditions of the land on which they are installed. Generally, the tubular rotating shafts 1 of two adjacent single-axis solar trackers S1-S5 have respective mutually facing open ends.

The photovoltaic panels 2 arranged in each single-axis solar tracker S1-S5 are connected in series and the electrical energy generated by same is conducted, by means of positive and negative wires 3a, 3b, to a junction box 10 located in the final single-axis solar tracker S5 of the row. In the embodiment shown, the positive conductor wires 3a and negative conductor wires 3b emerge from opposite ends of each single-axis solar tracker S1-S5, although this is not an essential condition.

The positive and negative wires 3a, 3b conducting electrical energy generated by the photovoltaic panels 2 connected in series in the different single-axis solar trackers S1-S5 are inserted into the tubular rotating shafts 1 through open ends thereof and are housed inside one or more of the tubular rotating shafts 1. More specifically, the positive and negative wires 3a, 3b of each single-axis solar tracker S1-S5 are gradually added to the positive and negative wires 3a, 3b of successive single-axis solar trackers S1-S5 inside successive tubular rotating shafts 1, and are finally connected to the junction box 10.

Between every two adjacent single-axis solar trackers S1-S5, the positive and negative wires 3a, 3b emerge from an open final end of the tubular rotating shaft 1 of one of the adjacent single-axis solar trackers S1-S5 and are inserted into the tubular rotating shaft 1 of the other adjacent single-axis solar tracker S1-S5 through an open initial end of the corresponding tubular rotating shaft 1. In the embodiment shown, the positive and negative wires 3a, 3b are conducted from the open final end of one of the tubular rotating shafts 1 to the open initial end of the tubular rotating shaft 1 of the other adjacent single-axis solar tracker S1-S5 inside a protective sleeve 5.

Figure 3:
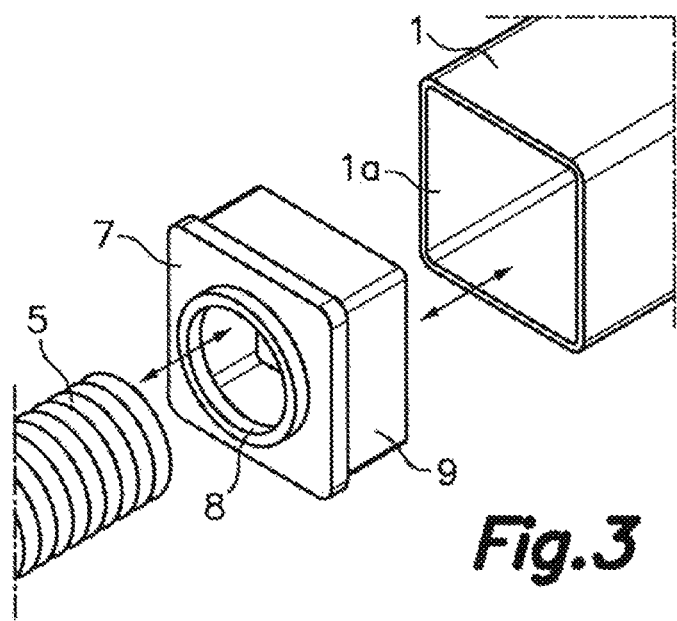
FIG. 3 is a schematic perspective view showing an open end of a tubular rotating shaft, with a cap and a protective sleeve according to an embodiment.

As best shown in FIG. 3, the tubular rotating shaft 1 has a square cross-section and at each of the open initial and final ends 1a, 1b thereof there is coupled a respective cap 7 having an opening 8 and a projection 9 which is plugged into the corresponding open initial or final end 1a, 1b of the tubular rotating shaft 1. The protective sleeve 5 has the ends thereof plugged into the openings 8 of the caps 7 located at the open initial and final ends 1a, 1b of the tubular rotating shafts 1 of two adjacent single-axis solar trackers S1-S5.

Although FIG. 3 only shows the open initial end 1a of the tubular rotating shaft 1 and the corresponding cap 7, it must be pointed out that the open final end 1b and the corresponding cap 7 are similar. Likewise, the cap 7 could have several projections instead of just the one projection 9 shown for being plugged into the corresponding open initial or final end 1a, 1b of the tubular rotating shaft 1 with an equivalent result.

The protective sleeve 5 is preferably made of a flexible material, such as plastic or elastomer, for example. In the embodiment shown, the protective sleeve 5 is in the form of a corrugated tube. The positive and negative wires 3a, 3b can be inserted into the tubular rotating shafts 1 through the openings 8 of the caps 7, for example through a space formed between an inner rim of the opening 8 of the cap 7 and an elastically deformed portion of the wall of the protective sleeve.

Figure 4:
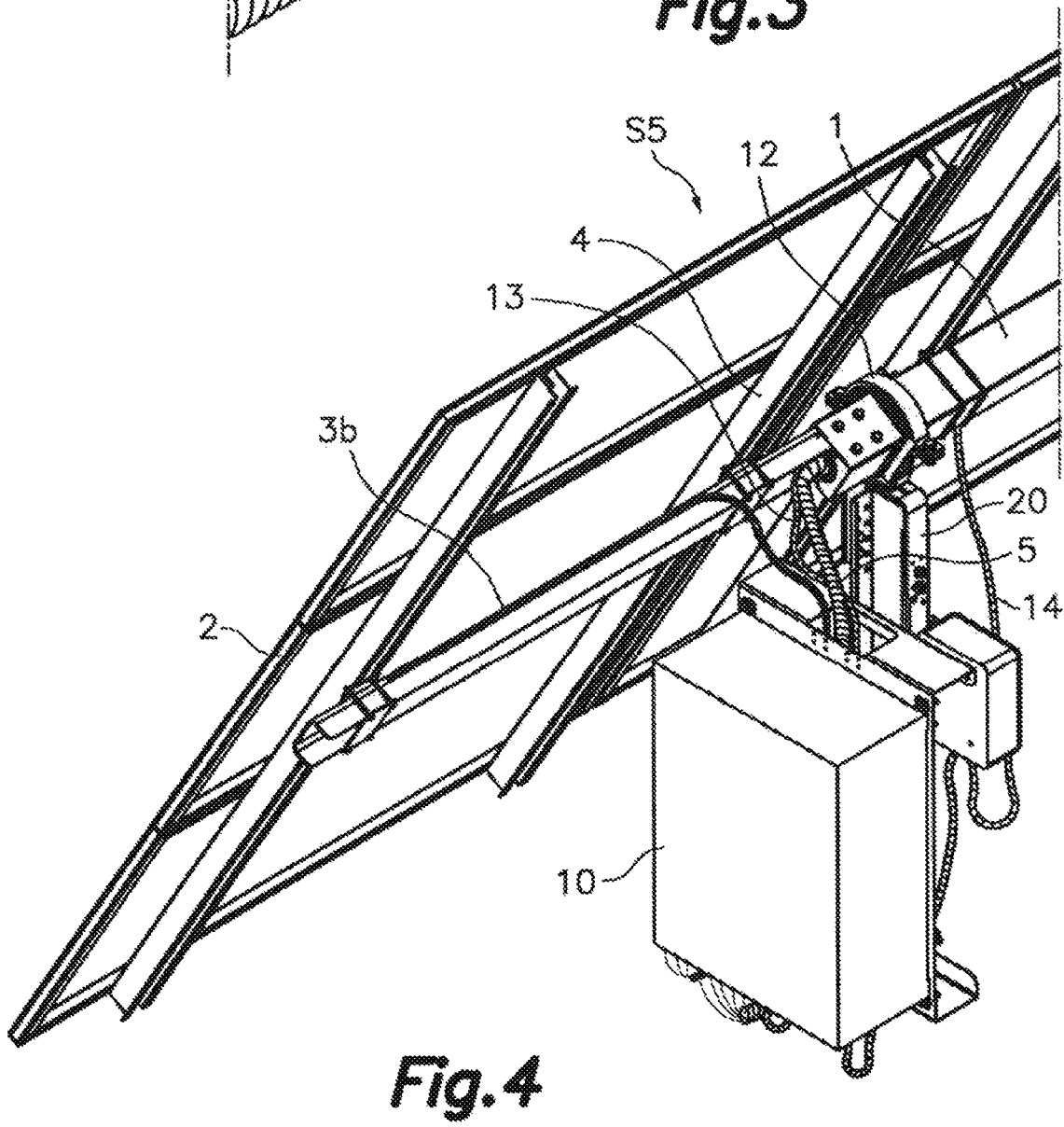
FIG. 4 is a partial perspective view showing the final single-axis solar tracker including a junction box.

FIG. 4 shows an end of the single-axis solar tracker S5 located in the last spot in the row, and it allows observing the elongated structure 4 on which there are installed in a co-planar manner a plurality of photovoltaic panels 2, the tubular rotating shaft 1, one of the support feet 20 which supports a bearing 12 coupled to the tubular rotating shaft 1, the junction box 10, and the protective sleeve 5 conducting the positive and negative wires 3a, 3b from the open final end of the tubular rotating shaft 1 to the junction box 10.

A negative conductor wire 3b emerging from the photovoltaic panels 2 connected in series in this single-axis solar tracker S5 is connected directly to the junction box 10. A signal cable 13 and power supply cable 14 extending along the several single-axis solar trackers S1-S5 on the outside of the respective tubular rotating shafts 1, attached thereto, furthermore emerge from the junction box 10.

Figure 5:
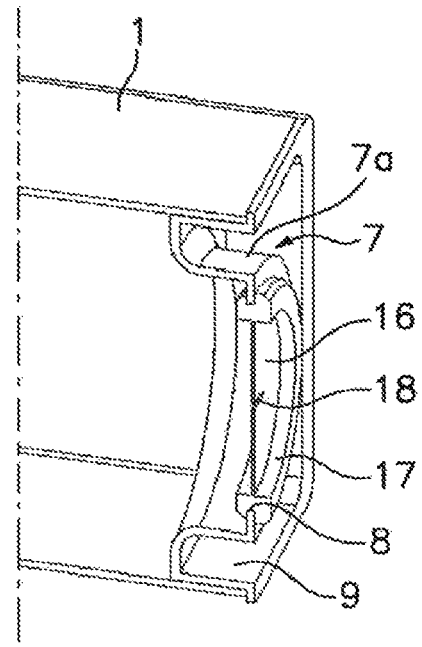
FIG. 5 is a cutaway perspective view showing an open end of a tubular rotating shaft, with a cap and a protective sleeve according to another embodiment.

FIG. 5 illustrates an alternative embodiment in which the open initial and final ends of the tubular rotating shafts 1 have caps 7 coupled thereto. For example, the tubular rotating shafts 1 have a square cross-section and each cap 7 has one or more projections 9 which are plugged into the corresponding open end of the tubular rotating shaft 1. The cap 7 has an opening 8 covered by a membrane 16 having at least one cut 18, and preferably two crossed cuts 18, located in a central region of the membrane 16. In the illustrated embodiment, the membrane 16 is supported in a ring 17 fixed to the opening 8. More specifically, the caps 7 have a neck 7a the rim of which defines the opening 8, and the ring 17 is fixed at the rim of the neck 7a. This embodiment makes it unnecessary to use the mentioned corrugated tube inside the tubular rotating shafts 1, since the caps 7 protect the cables from the sharp edges present at the open end of the tubular rotating shafts 1.

These one or more cuts 18 allow the passage of the positive and negative wires 3a, 3b and at the same time support them in a centered position in which they do not come into contact with the edges of the ends of the tubular rotating shafts 1, thereby preventing friction without having to use a protective sleeve.

Figure 6:
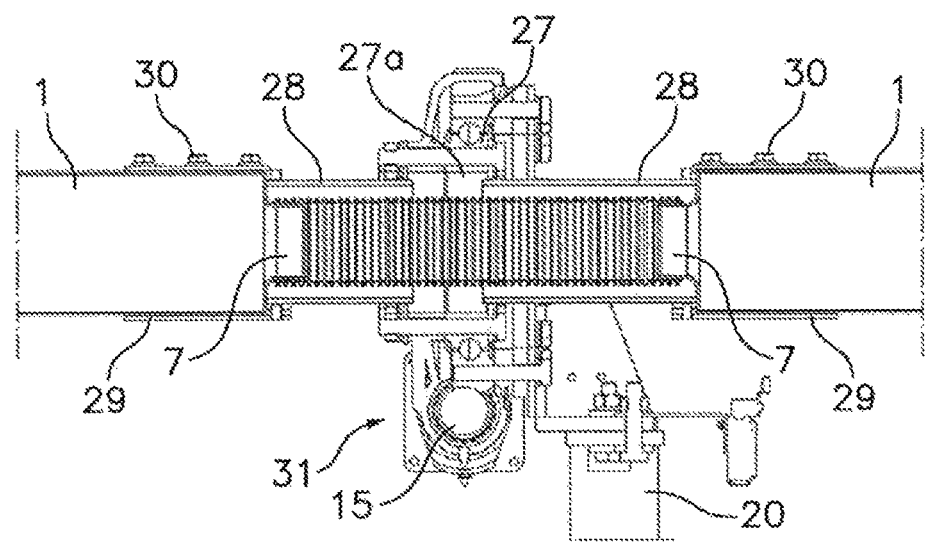
FIG. 6 is a partial cross-section view showing the connection of two tubular rotating shafts to a gear reducer.
Figure 7:
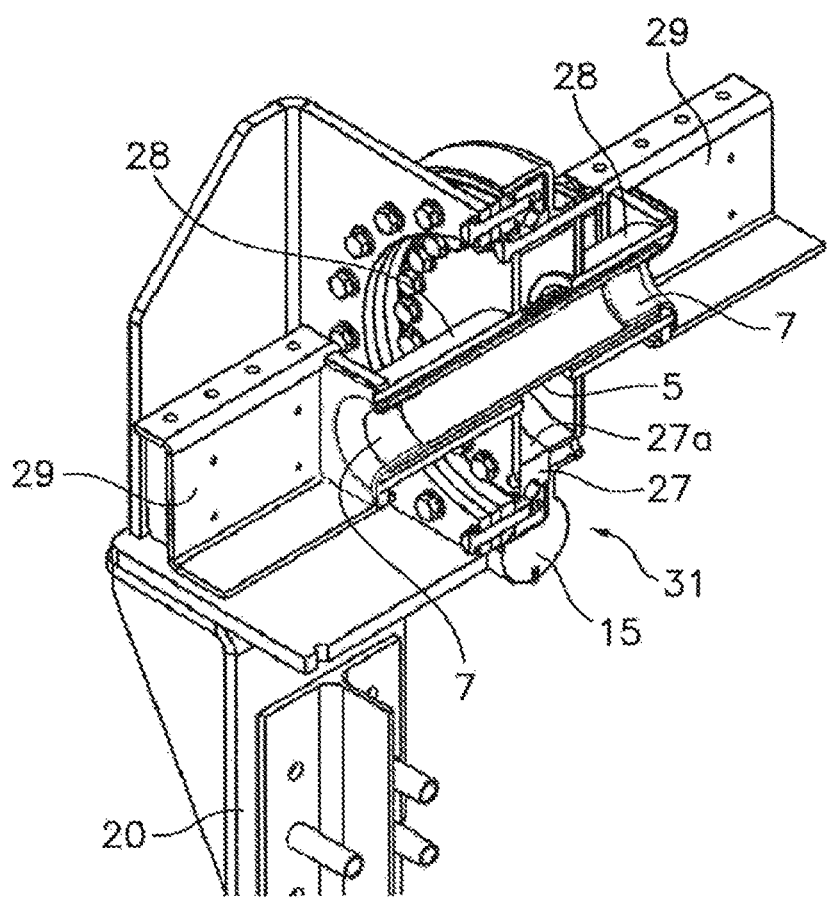
FIG. 7 is a cutaway perspective view showing the elements that perform the connection of FIG. 6, where the tubular rotating shafts have been omitted for clarity.

FIGS. 6 and 7 show the connection of the open ends of two tubular rotating shafts 1 of a single-axis solar tracker S1-S5 adjacent to a rotating drive wheel 27 of a drive device 31. For example, the rotating drive wheel 27 is part of a reducer gear and is driven by a drive motor 15 supported on one of the support feet 20.

The open ends of the two adjacent tubular rotating shafts 1 are coaxially fixed to the rotating drive wheel 27 by rigid tubular connecting elements 28. The rotating drive wheel 27 has a central opening 27a. At the open initial and final ends of the tubular rotating shafts 1 there are installed respective caps 7 provided with an opening 8. Inside the tubular connecting elements 28 and through the central opening 27a of the rotating drive wheel 27 there is installed a protective sleeve 5 having the ends thereof connected to the openings 8 of the caps 7, and the positive and negative wires 3a, 3b are conducted from one of the open final ends of the tubular rotating shafts 1 to the other through the inside of the protective sleeve 5. Accordingly, the positive and negative wires 3a, 3b go from one of the open final ends of the tubular rotating shafts 1 to the other through the inside of the tubular connecting elements 28 and through the central opening 27a of the rotating drive wheel 27.

As best shown FIG. 7, each of the tubular connecting elements 28 has one end fixed to the rotating drive wheel 27 and the other opposite end fixed to a support 29, and the corresponding tubular rotating shaft 1 is fixed to the support 29 by detachable fixing elements 30, such as screws, for example.

The scope of the present invention is defined in the attached claims.

The invention claimed is:

1. A solar energy harvesting device, including several single-axis solar trackers (S1-S5), each of said single-axis solar trackers (S1-S5) comprising an elongated structure (4) on which there are installed in a co-planar manner a plurality of photovoltaic panels (2), a tubular rotating shaft (1) fixed to a lower side of said structure (4) and arranged along a longitudinal direction thereof, a plurality of support feet (20) distributed along the structure (4), each support foot having an upper end which supports a bearing coupled to said tubular rotating shaft (1) and a lower end anchored to the ground, and a drive motor operatively connected for rotating the tubular rotating shaft (1) together with the structure (4) and said photovoltaic panels (2) according to the relative movements of the Sun, the tubular rotating shafts (1) of the several single-axis solar trackers (S1-S5) being coaxially aligned, characterized in that positive and negative wires (3a, 3b) conducting electrical energy generated by the photovoltaic panels (2) connected in series of the different single-axis solar trackers (S1-S5) are housed inside one or more of the tubular rotating shafts (1), wherein open ends of two adjacent tubular rotating shafts (1) are coaxially fixed to a rotating drive wheel (27) of a drive device (31) by tubular connecting elements (28), wherein said rotating drive wheel (27) has a central opening (27a), and wherein the positive and negative wires (3a, 3b) go from one to the other of the open ends of the tubular rotating shafts (1) through the inside of said tubular connecting elements (28) and through said central opening (27a) of the rotating drive wheel (27).

2. The solar energy harvesting device according to claim 1, characterized in that said positive and negative wires (3a, 3h) from the photovoltaic panels (2) connected in series of the different single-axis solar trackers (S1-S5) are inserted into the tubular rotating shafts (1) through open ends thereof.

3. The solar energy harvesting device according to claim 1, characterized in that said positive and negative wires (3a, 3h) emerge from an open final end of the tubular rotating shaft (1) of one of the of the single-axis solar trackers (S1-S5) and are inserted into the tubular rotating shaft (1) of another adjacent single-axis solar tracker (S1-S5) through an open initial end of the corresponding tubular rotating shaft (1).

4. The solar energy harvesting device according to claim 3, characterized in that the positive and negative wires (3a, 3b) of each single-axis solar tracker (S1-S5) are gradually added to the positive and negative wires (3a, 3b) of successive single-axis solar trackers (S1-S5) and are connected to a junction box (10) located in a final single-axis solar tracker (S5).

5. The solar energy harvesting device according to claim 3, characterized in that the positive and negative wires (3a, 3b) are conducted from said open final end of one of the tubular rotating shafts (1) to said open initial end of the tubular rotating shaft (1) of another adjacent single-axis solar tracker (S1-S5) inside a protective sleeve (5).

6. The solar energy harvesting device according to claim 5, characterized in that the open initial and final ends of each tubular rotating shaft (1) have respective caps (7) provided with at least one opening (8), and said protective sleeve (5) has the ends thereof connected to said openings (8) of the caps (7) located at the open initial and final ends of the tubular rotating shafts (1) of two adjacent single-axis solar trackers (S1-S5).

7. The solar energy harvesting device according to claim 5, characterized in that said protective sleeve (5) is made of a flexible material.

8. The solar energy harvesting device according to claim 7, characterized in that said protective sleeve (5) is in the form of a corrugated tube.

9. The solar energy harvesting device according to claim 6, characterized in that said cap (7) has one or more projections (9) which are plugged into the corresponding open initial or final end of the tubular rotating shaft (1).

10. The solar energy harvesting device according to claim 3, characterized in that the open initial and final ends of the tubular rotating shafts (1) have respective caps (7) provided with an opening (8) covered by a membrane (16), and said membrane (16) has at least one cut (18) in a central region thereof for the passage of the positive and negative wires (3*a*, 3*b*).

11. The solar energy harvesting device according to claim 10, characterized in that the membrane (16) is supported in a ring (17) fixed to said opening (8).

12. The solar energy harvesting device according to claim 11, characterized in that the caps (7) have a neck (7*a*) having a rim defining the opening (8), and said ring (17) is fixed at said rim of the neck (7*a*).

13. The solar energy harvesting device according to claim 1, characterized in that the open initial and final ends of the tubular rotating shafts (1) have respective caps (7) provided with at least one opening (8), inside the tubular connecting elements (28) and through the central opening (27*a*) of the rotating drive wheel (27) there is installed a protective sleeve (5) having the ends thereof connected to said openings (8) of the caps (7), and the positive and negative wires (3*a*, 3*b*) are conducted from one of the open final ends of the tubular rotating shafts (1) to the other through the inside of said protective sleeve (5).

14. The solar energy harvesting device according to claim 13, characterized in that each of the tubular connecting elements (28) has one end fixed to the rotating drive wheel (27) and the other opposite end fixed to a support (29), and the corresponding tubular rotating shaft (1) is fixed to said support (29) by detachable fixing elements (30).

15. The solar energy harvesting device according to claim 1, characterized in that each of the tubular connecting elements (28) has one end fixed to the rotating drive wheel (27) and the other opposite end fixed to a support (29), and the corresponding tubular rotating shaft (1) is fixed to said support (29) by detachable fixing elements (30).

\* \* \* \* \*